United States Patent [19]

Inaba et al.

[11] Patent Number: 4,495,453
[45] Date of Patent: Jan. 22, 1985

[54] SYSTEM FOR CONTROLLING AN INDUSTRIAL ROBOT

[75] Inventors: Hajimu Inaba, Hino; Shinsuke Sakakibara, Komae; Shigemi Inagaki, Musashino; Nobutoshi Torii, Hachioji, all of Japan

[73] Assignee: Fujitsu Fanuc Limited, Tokyo, Japan

[21] Appl. No.: 391,396

[22] Filed: Jun. 23, 1982

[30] Foreign Application Priority Data

Jun. 26, 1981 [JP] Japan ................................ 56-98388

[51] Int. Cl.³ .............................................. G05B 19/42
[52] U.S. Cl. ..................................... 318/568; 318/602; 318/603; 901/29; 364/167
[58] Field of Search ................................ 318/567–569, 318/590, 591, 600, 602, 603, 626, 652; 364/167, 180, 181; 901/23, 24, 26, 28, 29

[56] References Cited

U.S. PATENT DOCUMENTS

| 3,839,664 | 10/1974 | Dirks et al. ............... 318/602 X |
| 3,995,205 | 11/1976 | Klees ......................... 318/591 X |
| 4,140,953 | 2/1979 | Dunne ........................ 318/568 |
| 4,141,065 | 2/1979 | Sumi et al. ............... 318/591 X |
| 4,206,392 | 6/1980 | Shimajiri et al. ........ 318/602 |
| 4,254,368 | 3/1981 | Ido et al. .................. 318/603 |
| 4,260,940 | 4/1981 | Engelberger et al. ..... 318/568 X |
| 4,260,941 | 4/1981 | Engelberger et al. ..... 318/568 X |
| 4,275,986 | 6/1981 | Engelberger et al. .. |
| 4,347,470 | 8/1982 | Kohzai et al. ............. 318/602 |

Primary Examiner—B. Dobeck
Attorney, Agent, or Firm—Armstrong, Nikaido, Marmelstein & Kubovcik

[57] ABSTRACT

A system for controlling an industrial robot having a wrist (1) driven to rotate by a direct-current motor (2) having a servomechanism, wherein stroke-limit position control (6) of the wrist and rotational control (7) of the wrist can be selectively carried out.

3 Claims, 3 Drawing Figures

SYSTEM FOR CONTROLLING AN INDUSTRIAL ROBOT

BACKGROUND OF THE INVENTION

1. Field of the Invention

The present invention relates to a system for controlling an industrial robot. More particularly, it relates to a system for controlling the rotation of a robot wrist having a servomechanism.

2. Description of the Prior Art

Generally, in industrial robots, the wrist and hand are attached to the end of an arm by means through of a joint, that is, a bevel gear. Workpieces or parts are grasped by the hand. The wrist is rotatable with respect to the arm, and such rotation is effected by the use of a servomechanism. For example, the wrist is driven to rotate by a direct-current motor. The output shaft of the direct-current motor is provided with a pulse coder. The output pulses of the pulse coder are fed back to a motor-drive control circuit.

A prior art system for controlling an industrial robot having such a servomechanism has a stroke-limit position control means to define the rotation of the wrist with, in a predetermined range. That is, a pulse coder is provided on the output shaft of the wrist-driving direct-current motor. The pulse coder produces a pulse count which is controlled within a range between a predetermined minimum value and a predetermined maximum value.

In the above-mentioned prior art, however, when the robot is performing operations for rotating parts such as screws, the control system is not suitable.

SUMMARY OF THE INVENTION

It is, therefore, a principal object of the present invention to provide a system for controlling an industrial robot in which control by the rotations of the wrist, as well as stroke-limit position control, is possible, thereby enabling operations for mounting parts such as screws to be carried out.

According to the present invention, there is provided a system for controlling an industrial robot having a wrist driven to rotate by a direct-current motor which is controlled by feeding back the output pulses of a pulse coder provided on the output shaft of the direct-current motor, comprising a stroke-limit position control means, connected to the pulse coder, for controlling the position of the wrist between the minimum stroke and the maximum stroke; a rotational control means, connected to the pulse coder, for controlling the rotations of the wrist; and a selecting means, connected between the direct-current motor and the outputs of the stroke-limit position control means and the rotational control means, for selecting either stroke-limit control or rotational control.

DESCRIPTION OF THE PREFERRED EMBODIMENT

Figure 1:
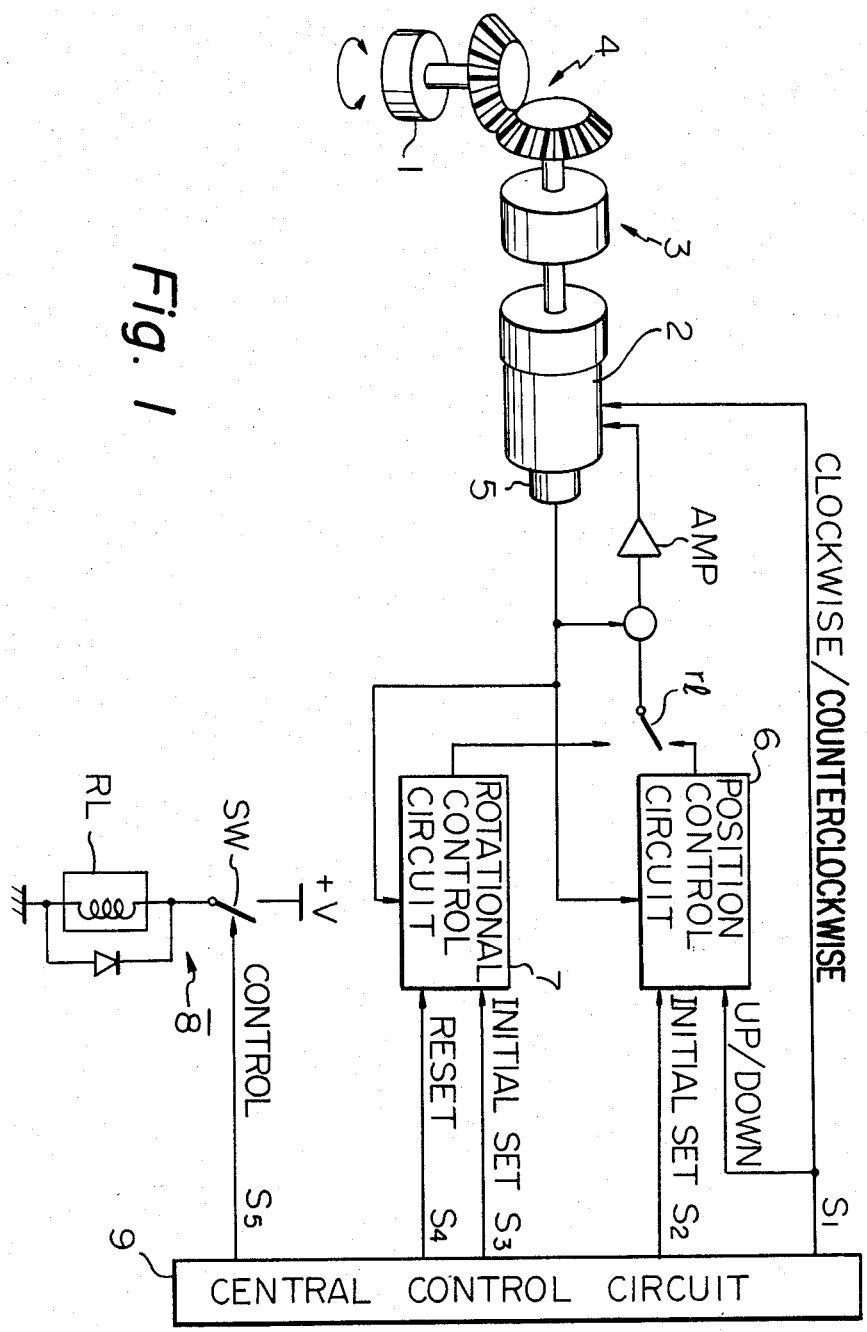
FIG. 1 is a block circuit diagram illustrating an embodiment of the system for controlling an industrial robot according to the present invention.

In FIG. 1, a wrist 1 of a robot is rotatable as indicated by the arrow. This wrist 1 is driven to rotate by a direct-current motor 2. That is, the direct-current motor 2 causes the wrist 1 to rotate by means of a harmonic drive 3 having a buffer effect and by a bevel gear 4. In this case, the direct-current motor 2 has a servomechanism. That is, the position of the direct-current motor 2 is controlled by feeding back the output pulses of a pulse coder 5 provided on the output shaft of the direct-current motor 2 to a control system which is comprised of a stroke-limit position control circuit 6, a rotational control circuit 7, a selection control circuit 8, and a central control circuit 9.

The stroke-limit position control circuit 6 is used for controlling the position of the wrist 1 between the minimum stroke and the maximum stroke while the rotational circuit 7 is used for controlling the rotations of the wrist 1. Each of the circuits 6 and 7 receives the output pulses of the pulse coder 5. The switching of the two control circuits 6 and 7 is carried out by the control circuit 8 which is comprised of a relay circuit formed by a relay coil RL, a relay contact rl, and a switch SW. In this case, excitation of the relay coil RL is carried out by the switch SW which is controlled by the central control circuit 9. Thus, the direct-current motor 2 carries out either stroke-limit position control or rotational control. Note that AMP is a servoamplifier.

The central control circuit 9 is used for the entire system. That is, the central control circuit 9 generates a signal $S_1$ to the direct-current motor 2 and to the control circuit 6. In this case, the signal $S_1$ serves as a clockwise/counterclockwise rotation indicator for the direct-current motor 2 and as an up/down indicator for a counter (not shown) for the control circuit 6. In addition, the central control circuit 9 generates an initial set signal $S_2$ to the control circuit 6 and generates an initial set signal $S_3$ and a reset signal $S_4$ control circuit 7. Further, the central control circuit 9 generates a control signal $S_5$ to the control circuit 8.

Figure 2:
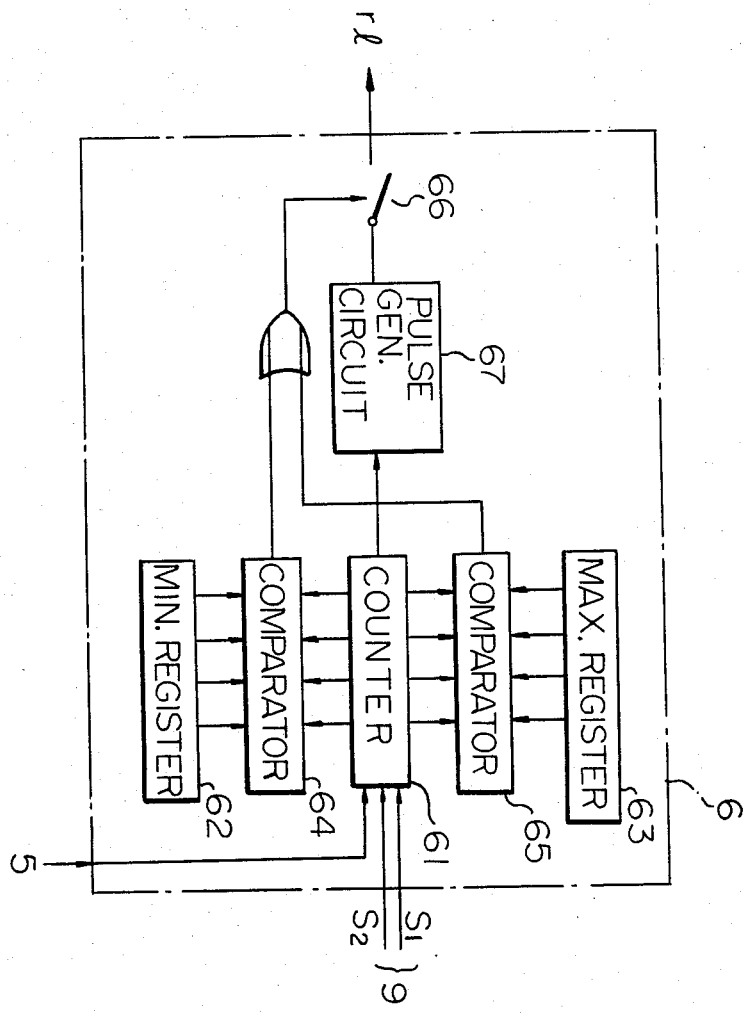
FIG. 2 a block circuit diagram of the positional control circuit of FIG. 1.

The stroke-limit position control will now be explained. In FIG. 2, an up/down counter 61 is used for counting the output pulses of the pulse coder 5 (FIG. 1). In this case, the initial value of the counter 61 is set by the signal $S_2$ from the central control circuit 9 and, in addition, receives the up/down indicator signal $S_1$ from the central control circuit 9. The count value of the counter 61 is continuously compared with the predetermined values of a minimum register 62 and a maximum register 63 by the comparators 64 and 65, respectively. The value of the minimum register 62 corresponds to the minimum stroke of the wrist 1 of FIG. 1 while the value of the maximum register 63 corresponds to the maximum stroke of the wrist 1.

In FIG. 2, when the count value of the counter 61 matches the value of either the minimum register 62 or the maximum register 63, the output signal of the comparator 64 or 65 becomes the logic "1" so that the switch 66 is turned off. As a result, the output pulses of a pulse-generating circuit 67 are not supplied to the direct-current motor 2 of FIG. 1 which, in turn, remains in a non-driving state. When the count value of the counter 61 is between the values of the two registors 62 and 63, the switch 66 is turned on so that the output pulses of the pulse-generating circuit 67 are supplied through the conductive stage relay contact rl and the servoamplifier AMP of FIG. 1 to the direct-current motor 2, which, in turn, remains in a driving state. Thus, when the relay contact rl is in the upward position in FIG. 1, the position of the wrist 1 is controlled with in a range between the minimum stroke and the maximum stroke.

Note that the pulse-generating circuit 67 is used for feeding back the output pulses of the pulse coder 5 to the direct-current motor 2 so as to perform a servo control of the direct-current motor 2.

Figure 3:
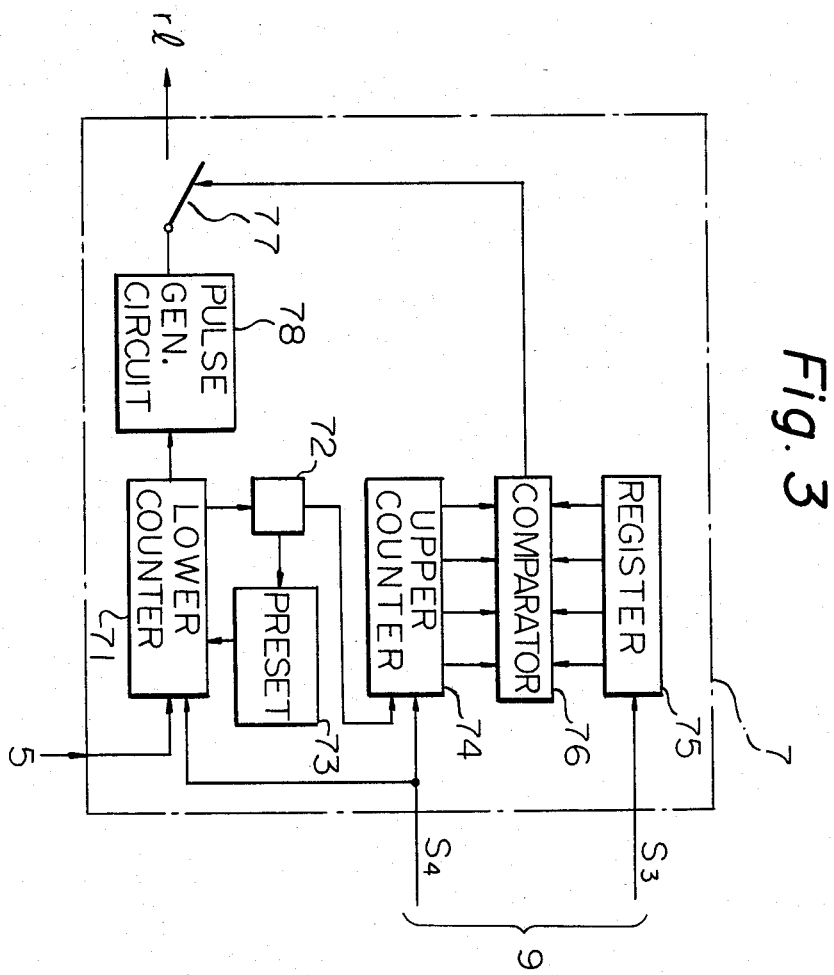
FIG. 3 is a block circuit diagram of the rotational control circuit of FIG. 1.

The rotational control will now be explained. In FIG. 3, the output pulses of the pulse coder 5 of FIG. 1 are counted by a lower counter 71, which is, in this case, an up counter. When the count value of the counter 71 exceeds a predetermined value, carry data is set in a register 72. In this case, the predetermined value corresponds to a predetermined revolution of the wrist 1 of FIG. 1, such as one revolution, half a revolution, a quarter of a revolution, and the like. Every time such carry data is set in the register 72, the lower counter 71 is reset by a preset Unit 73, and simultaneously, an upper counter 74 is counted up. Therefore, if the above-mentioned value represents one revolution of the wrist 1 of FIG. 1, the count value of the upper counter 74 represents the rotations of the wrist 1. The count value of the upper counter 74 is continuously compared with the value of the register 75 by a comparator 76. The value of the register 75 is set by the initial set signal $S_3$, from the central control circuit 9 while the counters 71 and 74 are reset by the reset signal $S_4$ from the central control circuit 9.

In FIG. 3, when the count value of the upper counter 74 reaches the value of the register 75, that is, when the wrist 1 of FIG. 1 rotates a predetermined number of times, the comparator 76 turns off a switch 77 so that the output pulses of a pulse-generating circuit 78 are not supplied to the direct-current-motor 2 of FIG. 1, which, in turn, remains in a non-driving state. When the count value of the upper counter 74 is less than the value of the register 75, the switch 77 is turned on so that the output pulses of the pulse-generating circuit 78 are supplied through the conductive state relay contact rl and the servoamplifier AMP of FIG. 1 to the direct-current motor 2, which, in turn, remains in a driving state. Thus, when the relay contact rl is in the downward position in FIG. 1, the rotations of the wrist 1 of FIG. 1 are controlled.

Note that the lower counter 71 can be constructed as a down counter. In this case, the preset unit 73 presets a predetermined value in the lower counter 71.

The above-mentioned two kinds of controls means, that is, the stroke-limit position control means and the rotational control means, are switched by the switch SW of the selection control circuit 8.

In the above-mentioned embodiment, stroke limit position control and rotational control are carried out by hardware such as the control circuits 6 through 9. However, it should be noted that such controls can also be carried out by software.

As explained hereinbefore, the system for controlling an industrial robot according to the present invention is advantageous as compared with the prior art in that in this system operations for rotating parts such as screws can be carried out, since there can be performed both stroke-limit position control of the wrist and rotational control of the wrist.

We claim:

1. A system for controlling an industrial robot having a wrist rotated by a direct-current motor which is controlled by feeding back the output pulses of a pulse coder (5) provided on the output shaft of said direct-current motor, comprising:

a stroke-limit position control means connected to said pulse coder, for controlling the position of said wrist between the minimum stroke and the maximum stroke;

a rotational control means connected to said pulse coder, for controlling the rotations of said wrist; and a selecting means connected between said direct-current motor and the outputs of said stroke-limit position control means and said rotation control means, for selecting either stroke-limit position control or rotational control.

2. A system as set forth in claim 1, wherein said stroke-limit position control means comprises:

a first counter means for counting the output pulses of said pulse coder;

a first storing means for storing predetermined values corresponding to the minimum and maximum strokes of said wrist;

a first comparing means for comparing the count value of said first counter means with the predetermined values of said first storing means;

a first pulse-generating means for generating output pulses; and a first switching means connected to said first comparing means and to said first pulse-generating means, for supplying the output pulses of said first pulse-generating means to said direct-current motor when the counter value of said first counter means is between the predetermined values of said first storing means.

3. A system as set forth in claim 1, wherein said rotational control means comprises:

a second counter means for counting the output pulses of said pulse coder;

a third counter means for counting each time the counter value of said second counter means reaches a predetermined value;

a second storing means for a predetermined value;

a second comparing means for comparing the count value of said third counter means with the predetermined value of said second storing means;

a second pulse-generating means for generating output pulses; and a second switching means connected to said second comparing means and to said second pulse-generating means, for supplying the output pulses of said pulse-generating means to said direct-current motor only when the counter value of the third counter means is less than the predetermined value of said second storing means.

* * * * *